Dec. 3, 1963 A. H. B. WALKER 3,113,259

RECTIFIER CIRCUIT ARRANGEMENTS

Filed Jan. 26, 1960 2 Sheets-Sheet 1

INVENTOR

ALEC HERVEY BENNETT WALKER

BY Larson and Taylor

RECTIFIER CIRCUIT ARRANGEMENTS

Filed Jan. 26, 1960 2 Sheets-Sheet 2

INVENTOR

ALEC HERVEY BENNETT WALKER

BY Lawson and Taylor

United States Patent Office 3,113,259

Patented Dec. 3, 1963

3,113,259

RECTIFIER CIRCUIT ARRANGEMENTS

Alec Hervey Bennett Walker, King's Cross, London, England, assignor to Westinghouse Brake & Signal Company Limited, London, England Filed Jan. 26, 1960, Ser. No. 4,643
Claims priority, application Great Britain Feb. 4, 1959
5 Claims. (Cl. 321—24)

This invention relates to improved circuit arrangements for rectified current derived from a multi-phase source and supplied to a load.

It makes use of the principle of variable-phase automatic commutation between voltage taps on the secondary windings of multi-phase transformers, which can be achieved by appropriate arrangement of the taps thereof, in conjunction with conductivity controllable semi-conductor devices.

Advantages which it is an object of the invention to achieve are a continuous control without voltage surges being generated by the synchronous cyclic tap changes in a transformer and with the application to the semi-conductor devices of only the inter-tap voltage and not the full voltage.

According to the present invention there is provided a circuit arrangement for rectified current derived from a multi-phase source and supplied to a load which circuit arrangement comprises a multi-phase transformer arranged to be fed from the source, a lower and a higher voltage tap on each secondary winding of the transformer, a rectifier circuit path for connection between each lower voltage tap on each secondary winding and one side of the load, a conductivity controllable semi-conductor circuit path for connection between each higher voltage tap and the same side of the load, each semi-conductor circuit path having a blocking characteristic in the reverse direction and a breakover voltage for conduction in the forward direction and control means for each semi-conductor circuit path to apply a driving input thereto at variable instants in a respective phase of the source for transfer of the conductively operational circuit path from the rectifier circuit path connected to the lower voltage tap, which is conductively operational prior to the application of the driving input, to the semi-conductor circuit path connected to the higher voltage tap, the latter path being rendered conductively operational as a result of the application of the driving input.

Figure 1:
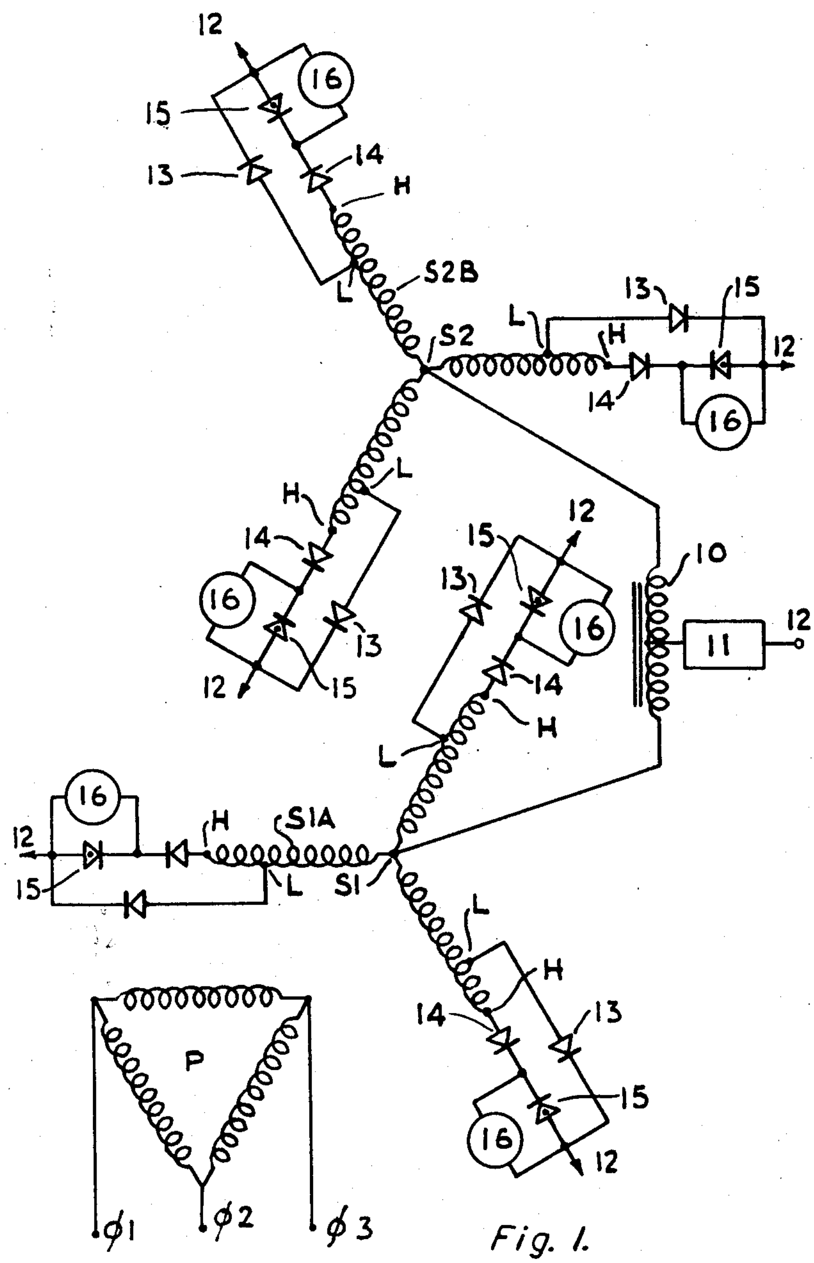
Figure 2:
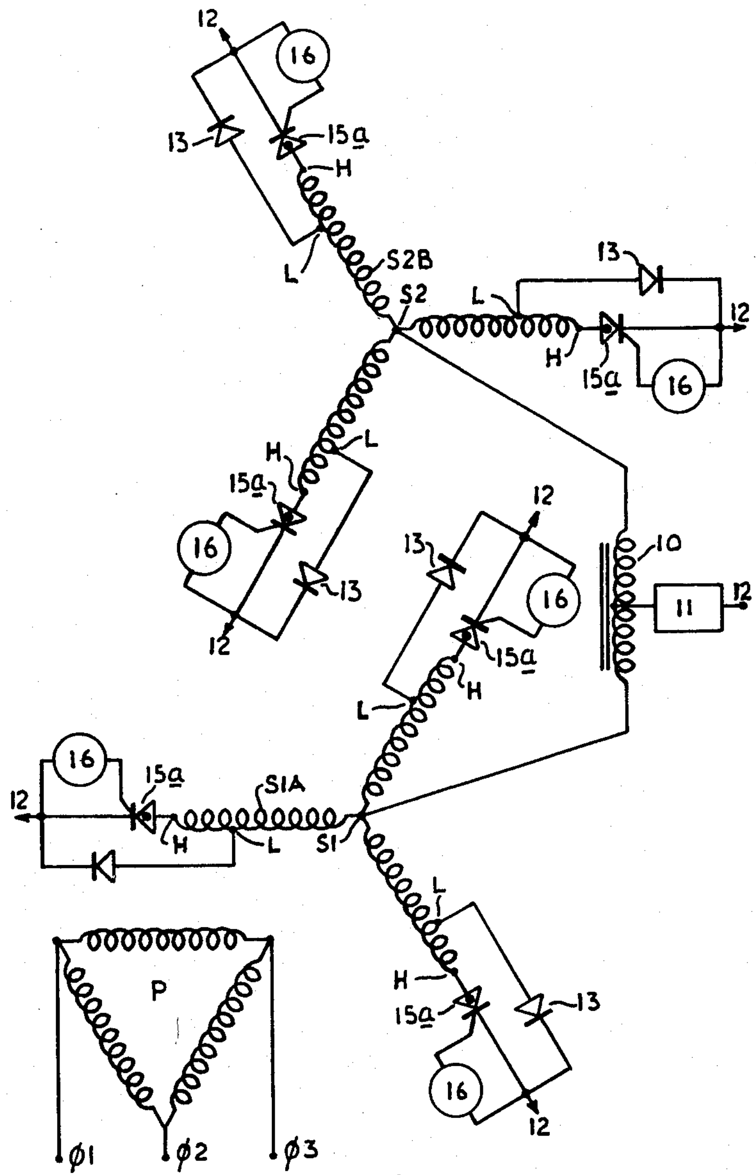

Reference is now made to the accompanying drawings, FIGS. 1 and 2, which drawings are embodiments of the present invention here given by way of example.

In the embodiment illustrated by FIG. 1 of the accompanying drawings a multi-phase current supply of phases indicated at $\phi 1$, $\phi 2$ and $\phi 3$ is fed to the primary winding P of a transformer having double-star six-phase secondary windings S1 and S2, the star points of which are connected to a reactor 10, the reactor being connected in turn to one side of a load 11.

The other side 12 of the load 11 is connected to the outputs from each of the phase windings S1 and S2.

Each winding has a lower voltage tap L and a higher voltage tap H. A diode rectifier 13 of any suitable type, such as a metal or crystal rectifier, is connected between the lower voltage tap L and the point 12. A blocking diode rectifier 14, also of the metal or crystal type, is connected in series with a controllable semi-conductor device 15, in the form of a two electrode semi-conductor switching device with a breakover voltage of predetermined value in the forward direction, between the higher voltage tap H in each secondary winding and the side 12 of the load 11.

Each semi-conductor switching device 15 has control means for rendering it conductive provided by a pulse generator or other suitable triggering device 16 which is adapted to feed it with a high voltage pulse at an appropriate instant in the half-wave period of the respective phase to convert it into a low resistance so that it can carry the load current when desired and in a manner to be described in greater detail hereinafter. The pulse generators may take the form of the pulse generators described and illustrated in United Kingdom patent applications 41849/59 and 41850/59.

It will be noted that each phase winding can supply the load 11 with a rectified unidirectional current either through the diode rectifier 13 from the lower voltage tap L or through the respective semi-conductor switching device 15 and diode rectifier 14 from the higher voltage tap H.

If no triggering pulses are being supplied from the pulse generator devices 16 to the respective semi-conductor switching devices 15 these will be of a sufficiently high resistance to prevent the flow of current through them and the diode rectifiers 13 will carry the load current and the load 11 will be supplied entirely from the lower voltage tap, L, the load voltage then being at its minimum value.

The operation of the circuit will be best understood from the sequence of events during the first two phases of the current supply as exemplified by the secondary windings S1A and S2B.

If at an instant when the phase supply to the winding S1A is nearing the end of a respective half-cycle, the tap point H being positive with respect to the tap point L, the semi-conductor switching device 15 in series with the winding is triggered by its associated generator device 16, then the load current flowing through the diode rectifier 13 connected to the tap L will commutate smoothly from this lower voltage tap L to the higher voltage tap H and will flow through the semi-conductor switching device 15.

The commutation of current from the tap L to the tap H occurs naturally at a rate dependent upon the reactance of the transformer and no voltage surges are produced. Immediately after such commutation has taken place the load voltage will therefore correspond to the voltage of the higher voltage tap H.

Now assuming that the semi-conductor switching device 15 in the next phase winding S2B has not yet been triggered, the current will continue to flow in the semi-conductor switching device 15 in the winding S1A until the voltage of the lower tap L in the winding S2B exceeds the voltage of the higher tap H in the winding S1A, whereupon the load current will commutate to the diode rectifier 13 in the winding S2B which will, of course, result in the semi-conductor switching device 15 in the winding S1A being restored to its original highly resistive and non-conducting condition.

By triggering the semi-conductor switching device 15 in the winding S2B at the correct instant the load current in that winding can be smoothly commutated up to the higher voltage tap in the same manner as with the winding S1A.

It will thus be seen that by triggering all the semi-conductor switching devices 15 in correct phase at instants which are smoothly variable between the time at which the diode rectifiers 13 in each phase winding begin to conduct, and the natural end of conduction in each phase, the proportion of total time for which the load 11 is connected to the higher voltage taps H in each winding, can be varied smoothly from zero to 100%. Consequently, the D.C. voltage on the load 11 can be varied smoothly between the voltages corresponding to the two taps L and H on each phase winding.

When the polarities reverse, that is, when the point H goes negative with respect to the point L, a short circuit of the upper section of each secondary winding is prevented by the blocking diode rectifiers 14 which are poled appropriately.

The embodiment illustrated in the accompanying drawing designated FIG. 2 has a rectifier circuit path provided by respective rectifiers, here also having the reference numeral 13, for connection between each lower voltage tap L on each secondary winding of the transformer and one side 12 of the load, with a conductivity controllable semi-conductor circuit path for connection between each higher voltage tap H and the same side 12 of the load. In this FIG. 2 each conductivity controllable semi-conductor circuit path has a semi-conductor switching device 15*a* of a form which, due to the mode of construction of the device, provides an inherent rectifier in each semi-conductor switching device. The semi-conductor switching devices 15*a* are three electrode devices with a permanent blocking characteristic in the reverse direction and a breakover voltage in the forward direction, the breakover voltage being controllable in dependence upon the voltage applied to a control electrode of the respective device.

It may be noted that the semi-conductor switching devices 15*a* in FIG. 2 are arrowed oppositely to the devices 15, it being intended to indicate that the devices 15 have their conducting direction in the opposite direction to that of the arrow at the apex of the respective dotted triangle, while it is intended to indicate that the devices 15*a* have their conducting direction in the same direction as the arrow at the apex of the respective dotted triangle. Further it may be noted from FIG. 2 that the pulse generators 16 are connected to the control electrodes of the respective semi-conductor switching devices 15*a* and that a separate rectifier for blocking the reverse direction of the respective semi-conductor switching devices 15*a* is omitted from FIG. 2 as normally not being required for use with such semi-conductor switching devices 15*a*.

A particular advantage of the above described circuit arrangements is that the maximum peak inverse voltage on the semi-conductor circuit paths is only the peak voltage between the voltage taps L and H.

The circuit arrangements can be used in conjunction with an A.C. supply of any number of two or more phases and may utilise any suitable transformer arrangement which is capable of supplying half-wave rectifiers.

Having thus described my invention what I claim is:

1. A circuit arrangement for producing rectified current derived from a multiphase source for supply to a load comprising a multiphase transformer including primary and secondary windings on said transformer, a multiphase source of electric power for supply to said primary, a lower and a higher voltage tap on each said secondary, a reactor, a load, connections between said reactor and each of said secondary windings, and a connection between said reactor and one side of said load, a rectifier circuit path for connection between each lower voltage tap on each said secondary and the other side of said load, a conductivity controllable semiconductor circuit path for connection between each higher voltage tap and the same said side of the load, each semiconductor circuit path having a blocking characteristic in the reverse direction and a breakover voltage for conduction in the forward direction, control means for each semiconductor circuit path for applying a driving input thereto at variable instants in a respective phase of the source for transfer of a conductively operational circuit path from the rectifier path connected to the lower voltage tap, said rectifier path being conductively operational prior to the application of said driving input to said semiconductor path connected to the higher voltage tap, said semiconductor path being rendered operationally conductive by the application of said driving input to thereby control smoothly the current commutation from the lower to the higher voltage tap.

2. The circuit arrangement as recited in claim 1, within each conductivity controllable semiconductor circuit path there is a rectifier poled to block in the reverse direction of the respective semiconductor path.

3. The circuit arrangement as recited in claim 1, within each conductivity controllable semiconductor circuit path there being a semiconductor switching device, a control electrode for said device, and driving circuit control means for applying a driving input to said control electrode for varying the breakover voltage at which said semiconductor device is rendered conductive.

4. The circuit arrangement as recited in claim 3, within each driving circuit control means there being a triggering pulse generator for supplying at variable instants of a respective phase of the supply source a triggering pulse input to a respective semiconductor switching device to render the respective semconductor path conductively operational for the remainder of the half-wave of the respective phase of said supply source.

5. The circuit arrangement as recited in claim 4, within which the instants of occurrence of the respective triggering pulses are variable continuously from the commencement of the half-wave period of the respective phases of the supply source to the termination thereof.

References Cited in the file of this patent

UNITED STATES PATENTS

| | | |
|---|---|---|
| 2,637,837 | Toulon | May 5, 1933 |
| 2,800,621 | Carlson et al. | July 23, 1957 |
| 2,925,546 | Berman | Feb. 16, 1960 |
| 2,959,726 | Jensen | Nov. 8, 1960 |
| 2,986,692 | Fisher | May 30, 1961 |